United States Patent
Mitsumoto et al.

(10) Patent No.: US 6,382,313 B2
(45) Date of Patent: May 7, 2002

(54) HEAT EXCHANGER FOR EASILY POLYMERIZING SUBSTANCE-CONTAINING GAS PROVIDED WITH GAS DISTRIBUTING PLATE

(75) Inventors: Tetsuji Mitsumoto; Takeshi Nishimura; Kazuhiko Sakamoto; Hiroo Iwato, all of Himeji (JP)

(73) Assignee: Nippon Shokubai Co., Ltd. (JP)

( * ) Notice: Subject to any disclaimer, the term of this patent is extended or adjusted under 35 U.S.C. 154(b) by 0 days.

(21) Appl. No.: 09/792,469

(22) Filed: Feb. 23, 2001

(30) Foreign Application Priority Data

Feb. 25, 2000 (JP) ........................................ 2000-049339

(51) Int. Cl.⁷ ................................................ F28D 7/00
(52) U.S. Cl. ........................ 165/159; 165/158; 165/174
(58) Field of Search ................................. 165/158, 159, 165/174, 157

(56) References Cited

U.S. PATENT DOCUMENTS

| | | | |
|---|---|---|---|
| 709,051 A | * 9/1902 | Schneller | 165/159 |
| 2,602,647 A | * 7/1952 | Miller | 165/159 |
| 2,729,432 A | * 1/1956 | Berg | 165/159 |
| 3,180,405 A | * 4/1965 | Hinde | 165/159 |
| 3,450,199 A | * 6/1969 | Warrell | 165/159 |
| 3,991,821 A | * 11/1976 | Cook et al. | 165/159 |
| 4,522,252 A | * 6/1985 | Klaren | 165/159 |
| 5,107,923 A | * 4/1992 | Sherman et al. | 165/159 |
| 5,261,485 A | * 11/1993 | Thornton et al. | 165/174 |
| 5,419,391 A | * 5/1995 | Chan et al. | 165/159 |
| 5,653,282 A | * 8/1997 | Hackemesser et al. | 165/159 |

OTHER PUBLICATIONS

Obana, H. "Impingement Baffle". Handbook for design of heat exchanger, Jan. 25, 1974 pp. 407–409.

* cited by examiner

Primary Examiner—Henry Bennett
Assistant Examiner—Terrell McKinnon
(74) Attorney, Agent, or Firm—Mathews, Collins, Sheperd & McKay, P.A.

(57) ABSTRACT

A heat exchanger for an easily polymerizing substance-containing gas provided with a shell possessed of a heat-exchanging gas inlet and a heat-exchanging gas outlet and a heat-exchanging part adapted to circulate fluid introduced from outside the shell between the gas inlet and said gas outlet, which heat exchanger is characterized by being provided with a gas distributing plate between the gas inlet and the heat-exchanging part. The heat exchanger is characterized by the gas distributing plate having a cross-sectional area in the range of 1.0–10.0 times the cross-section of the gas inlet. When an easily polymerizing substance-containing gas contacts a structure, the gas is condensed on the contact surface of the structure and suffered to generate a polymer. According to the heat exchanger of this invention, by uniformly distributing a gas in the heat-exchanging part, it is made possible to attain uniform distribution of heat, depress the possible condensation of the gas, and prevent the easily polymerizing substance from succumbing to polymerization.

5 Claims, 7 Drawing Sheets

FIG.8

HEAT EXCHANGER FOR EASILY POLYMERIZING SUBSTANCE-CONTAINING GAS PROVIDED WITH GAS DISTRIBUTING PLATE

BACKGROUND OF THE INVENTION

1. Field of the Invention

This invention relates to a heat exchanger used for a gas containing an easily polymerizing substance and provided between a heat-exchanging gas inlet and a heat-exchanging part with a gas distributing plate.

2. Description of Related Art

The heat exchanger for transferring heat between two fluids, the one having a high temperature and the other a low temperature, is one of the chemical devices extensively used in the chemical industry. The basis of the heat exchange resides in the exchange of heat between a high temperature fluid and a low temperature fluid through the medium of a heating surface.

Generally the heat exchanger fulfills the role of exchanging heat by introducing into a heat-exchanging part thereof fluid intended to be cooled or heated. The heat-exchanging part is known in various types including the shell-and-tube type having a bundle of numerous tubes inserted in a shell, the plate type having heating plates each containing corrugated ribs or semicircular ridges superposed and clamped through the medium of a gasket after the fashion of a filter press and consequently enabled to enclose thin flow paths of a rectangular cross section therewith and allowing a high temperature fluid and a low temperature fluid to flow through the flow paths on the alternating heating plates, and the fin tube type having a heating tube provided on the inner and/or outer wall surfaces thereof with fins intended to enlarge a heating surface and heightening the effect of heat transfer, for example.

The heat exchanger is extensively utilized generally as sorted by the nature of use into (1) a heater, i.e. a heat exchanger to be used for the purpose of heating a given fluid to a required temperature without changing the phase, (2) a preheater, i.e. a heat exchanger to be used for the purpose of heating a given fluid in advance and consequently exalting the efficiency of the subsequent step, (3) a superheater, i.e. a heat exchanger to be used for the purpose of heating a given fluid till a superheated state, (4) an evaporator, i.e. a heat exchanger to be used for the purpose of vaporizing a given fluid by heating, (5) a re-boiler, i.e. a heat exchanger to be used for the purpose of causing fluid condensed in a device to be heated again till vaporization, (6) a cooler, i.e. a heat exchanger to be used for the purpose of cooling a given fluid till a required temperature, (7) a chiller, i.e. a heat exchanger to be used for the purpose of cooling a given fluid till a very low temperature below 0° C., (8) a condenser, i.e. a heat exchanger to be used for the purpose of cooling a condensable gas till condensation and liquefaction, (9) a total condenser, i.e. a heat exchanger to be used for the purpose of thoroughly condensing a given condensable gas, and (10) a partial condenser, i.e. a heat exchanger to be used for the purpose of causing a given condensable gas to be partly condensed and liquefied and allowing the remainder thereof to be released in the gaseous state into the subsequent step, for example.

One example of the shell-and-tube type heat exchanger for one-pass operation will be described below with reference to FIG. 1. It is provided, however, that the heat-exchanging gas and/or the fluid may be led in or led out respectively through the inlet or the outlet in the opposite direction indicated in the following description, the gas may be led in or led out respectively through the fluid inlet or the fluid outlet or, by the same token, the fluid may be led in or let out respectively through the inlet or the outlet for the heat-exchanging gas, depending on the purpose or the necessity. Furthermore, the direction in which the heat exchanger is installed does not need to be limited to verticality but may be selected to suit the kind of the gas or the fluid to be handled and the purpose for which the heat exchanger is used.

Figure 1:
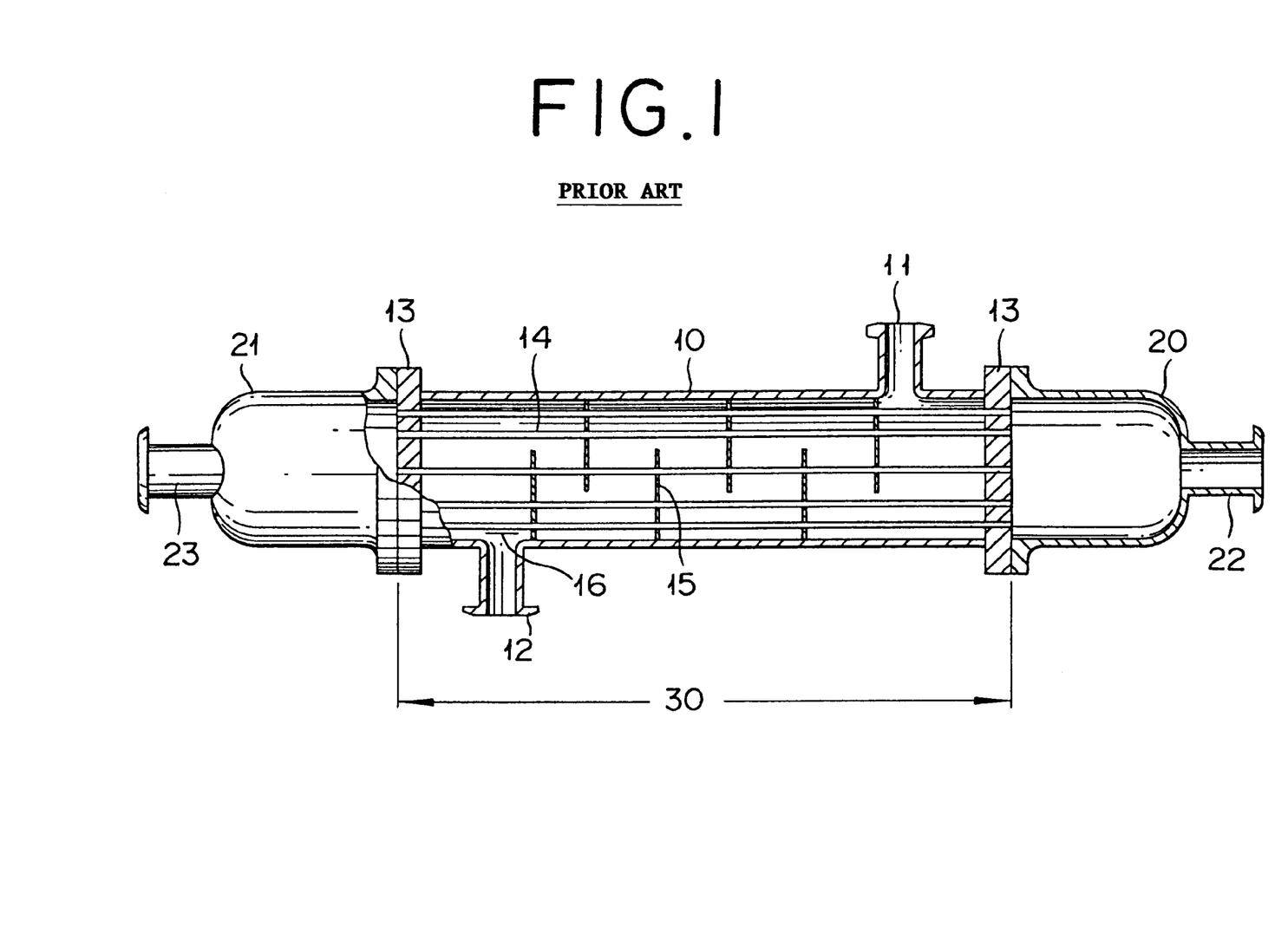
FIG. 1 is a schematic diagram of the conventional shell-and-tube type heat exchanger.

With reference to FIGS. 1, 10 stands for a shell, 11 for a fluid outlet, 12 for a fluid inlet, 13 for a tube sheet, 14 for a heat-transfer tube, 15 for a baffle plate, 16 for a impingement plate, 20 and 21 each for a channel, 22 for a heat-exchanging gas inlet, and 23 for a heat-exchanging gas outlet. In FIG. 1, the part interposed between the two tube sheets (13) inside the shell corresponds to a heat-exchanging part (30).

In this heat exchanger, the gas subjected to exchange of heat is supplied through the gas inlet (22) disposed in the channel (20), then introduced into the heat-transfer tube (14), and thereafter discharged through the heat-exchanging gas outlet (23) disposed in the channel (21). The fluid, for example heating medium, is introduced through the fluid inlet (12) disposed in the shell (10), caused to exchange heat efficiently with the gas in the heat-transfer tube (14) through the medium of the heat-transfer tube (14) as guided along the flow path altered by the baffle plate (15), and led out through the fluid outlet (11). By interposing the impingement plate (16) between the fluid inlet (12) and the heat-transfer tube (14), the fluid can prevent from inducing erosion on the surfaces of the tubes which is generated by fluid contacting directly the outer wall surfaces of the bundled tubes. Generally, the cross-sectional area of the gas inlet is smaller than the area of the heat-exchanging inlet part. The reason for this difference is that when the cross-sectional area of the gas inlet is equalized with that of the heat-exchanging inlet part, it will become necessary to enlarge the gas pipe and heighten the cost.

The difference in cross-sectional area between the gas inlet and the heat-exchanging part, however, forms a cause for lowering the ratio of heat exchange because the heat-exchanging gas is supplied in a large amount to the central part of the heat exchanger and in a small amount to the peripheral part thereof. The heat-transfer tube for introducing the heat-exchanging gas, however, has never been accorded any consideration about the adoption of a device for rendering the supply of the gas uniform. Barely, the wall thickness, cross-sectional area, tube layout, and pitch of the heat-transfer tube have been studied and the shape and disposal of the baffle plate have been studied.

Particularly when the ratio of heat exchange is ununiform where the heat-exchanging gas happens to be an easily polymerizing substance-containing gas, the easily polymerizing substance tends to succumb to polymerization due to condensation. Absolutely no measure has been devised against this detriment. In the shell-and-tube type heat exchanger which has gas pipes drawn in from the top of a distillation column, for example, the vapor abounding in a low boiling component and ascending to the top of the distillation column is cooled and condensed inside the heat-transfer tubes. This vapor tends to succumb to polymerization inside the heat exchanger when the substance subjected to distillation happens to be such an easily polymerizing compound as acrylic acid. For, the acrylic acid gas which has been obtained prevalently by the catalytic gas phase oxidation of propylene, for example, contains such impurities as water, acetic acid, and acrolein and tends to induce polymerization of acrylic acid easily. This polymerization cannot be prevented fully satisfactorily even by adding to the process a varying polymerization inhibitor such as, for example, phenothiazine, hydroquinone, methoquinone, cresol, phenol, or t-butyl catechol. Since such a polymerization inhibitor is a high boiling substance, the temperature conditions capable of gasifying the easily polymerizing substance fail to bring though incorporation of the polymerization inhibitor in the gas to be formed under such conditions. It follows that the slender heat-transfer tubes are liable to induce polymerization in their interiors and suffer deposition of a polymer on the inner walls thereof because the composition itself is in a very easily polymerizing state and, moreover, the polymerization inhibitor does not effectively discharge its own function in a gas.

The problems regarding the uniformity of the ratio of heat exchange, the distribution of the heat-exchanging gas, and the generation of a polymer by the easily polymerizing substance which are encountered by the heat exchanger are not limited to the shell-and-tube type heat exchanger mentioned above but are entailed by the fin tube type heat exchanger and the plate type heat exchanger as well.

Absolutely no study has ever been made as to the distribution of the heat-exchanging gas. Particularly in the heat exchange of an easily polymerizing gas, the problems such as the generation of a polymer in portion of the heat-exchanging part due to the degradation of the heat-transfer efficiency resulting from ununiform supply of the gas and also due to the concentration of the feed gas, the forced suspension of the entire system, and the decline of the heat-transfer efficiency resulting from the deposition of a polymer on the heat-transfer surface remain yet to be solved.

SUMMARY OF THE INVENTION

The present inventor has performed an elaborate study on the structure of a heat exchanger and has consequently found that the provision of a gas distributing plate between the heat-exchanging part and the heat-exchanging gas inlet allows the gas to be uniformly supplied to the heat-exchanging part and that the generation of the polymer can be effectively depressed by the disposition of the gas distributing plate. This invention has been perfected as a result.

To be specific, this invention is aimed at providing the following intellectual achievement.

A heat exchanger for an easily polymerizing substance-containing gas provided with a shell possessed of a heat-exchanging gas inlet and a heat-exchanging gas outlet and a heat-exchanging part adapted to circulate fluid introduced from outside the shell between the gas inlet and the gas outlet, which heat exchanger is characterized by being provided with a gas distributing plate between the gas inlet and the heat-exchanging part.

According to this invention, since the heat-exchanging gas containing an easily polymerizing substance is uniformly distributed in the heat-exchanging part inside the heat exchanger, the generation of a polymer which possibly occurs when the gas is ununiformly supplied to the heat-exchanging part can be repressed. When an easily polymerizing substance-containing gas contacts a structure where the distribution of a gas is not uniform, the gas touching the surface of the structure is caused to condense and stagnate and consequently give rise to a polymer. In the heat exchanger of this invention, it is made possible by effecting uniform distribution of the gas in the heat-exchanging part to repress the stagnation of the gas subsequent to the condensation and prevent the easily polymerizing substance from polymerizing.

DESCRIPTION OF THE PREFERRED EMBODIMENTS

This invention concerns a heat exchanger for an easily polymerizing substance-containing gas provided with a shell possessed of a heat-exchanging gas inlet and heat-exchanging gas outlet and a heat-exchanging part adapted to circulate fluid introduced from outside the shell between the gas inlet and the gas outlet, which heat exchanger is characterized by being provided with a gas distributing plate between the gas inlet and the heat-exchanging part. Now, a preferred embodiment of this invention which is provided in a shell-and tube type heat exchanger with a gas distributing plate will be described below with reference to FIG. 2.

Figure 2:
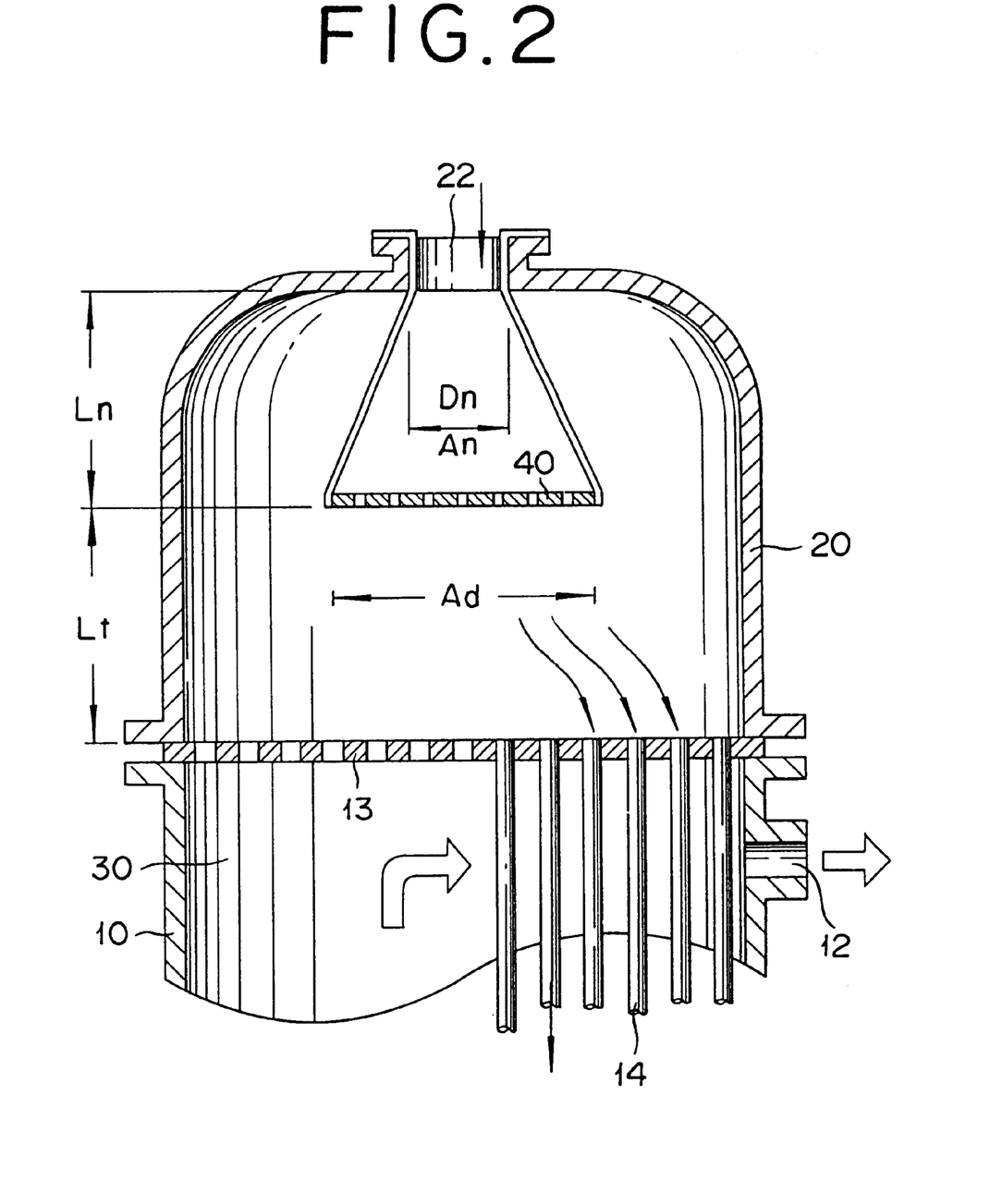
FIG. 2 is a partial diagram illustrating one mode of embodying the shell-and-tube type heat exchanger of this invention which is provided with a gas distributing plate. In this diagram, the flow of a heat-exchanging gas is indicated by filled arrow marks and the flow of fluid by empty arrow marks.

First, FIG. 2 is a partial diagram illustrating in type section a shell-and-tube type heat exchanger for one-pass operation with respect to the relation between the fluid gas inlet and the heat exchanging part. With reference to FIGS. 2, 10 stands for a shell, 13 for a tube sheet, 14 for a heat-transfer tube, 20 for a channel, 22 for a heat-exchanging gas inlet, 30 for a heat-exchanging part, and 40 for a gas distributing plate. The gas which has been introduced through the heat-exchanging gas inlet (22) into the heat exchanger is distributed through the medium of the gas distributing plate (40) and distributed uniformly on the surface of the tube sheet (13) exposed to the gas. The gas, therefore, is uniformly introduced to the numerous heat-transfer tubes (1) fitted to the tube sheet (13). Specifically, this invention is characterized by providing the gas distributing plate (40) between the gas inlet and the heat-exchanging part. Consequently, the heat-exchanging gas can be uniformly distributed thereby increasing the ratio of heat exchange in the heat-exchanging part. Particularly when the heat-exchanging gas happens to be an easily polymerizing substance-containing gas, the uniform distribution can prevent the partial condensation of the easily polymerizing substance-containing gas, the consequent generation of a polymer, and the deposition of the formed polymer. Generally, a polymerization inhibitor is added to a purification column which is operated for purifying a gaseous easily polymerizing substance, which is prevalently a high boiling substance. Thus, the easily polymerizing substance-containing gas does not sufficiently contain the polymerization inhibitor and, therefore, tends to succumb to condensation and consequently generate a polymer of the easily polymerizing substance. The condensation and the generation of a polymer, when the ratio of heat exchange is not uniform, are liable to entail generation of a polymer because the condensate stagnates in part of the heat exchanger for a comparatively long period of time. When the introduced gas is an easily polymerizing substance, therefore, the heat exchange, when performed after the gas has been uniformly distributed, exalts the efficiency of heat exchange and prevents the generation of a polymer as well. It has been heretofore held that an addition to the structure results in increasing the surface of contact with the easily polymerizing gas and promoting the partial stagnation of the condensate and the fluid. It has been ascertained, however, that in accordance with this invention, the occurrence of the polymerization of an easily polymerizing substance can be effectively prevented by interposing the gas distributing plate between the gas inlet and the heat-exchanging part.

The easily polymerizing substance is only required to assume a gaseous state at the time that it is introduced into the heat exchanger. The discrimination between the gaseous state and the liquid state prevailing under the standard conditions is irrelevant. As concrete examples of the easily polymerizing substance answering the requirement, acrylic acid, methacrylic acid, maleic acid, and esters thereof, and styrene and acrylonitrile may be cited. The easily polymerizing substances may further contain high boiling substances and solvent, subliming substances, and mixtures thereof. Particularly advantageous easily polymerizing substances include acrylic acid, methacrylic acid, and esters thereof. They may further contain solvents and other mixtures. In the case of acrylic acid and acrylic esters, for example, acetic acid, propionic acid, acrolein, maleic acid, water, and formalin mixture which are by-produced when acrylic acid is obtained by the reaction of catalytic gas phase oxidation may be cited. Then, in the case of methacrylic acid and methacrylic esters, for example, methacrolein, acrylic acid, and acetic acid mixtures which are by-produced when methacrylic acid is obtained by the reaction of catalytic gas phase oxidation may be cited.

This invention has the gas distributing plate interposed between the gas inlet and the heat-exchanging part. The cross-sectional area of this gas distributing plate (40) is preferably in the range of 1.0–10.0 times, more preferably in the range of 1.2–8.0 times, and particularly preferably in the range of 1.5–6.0 times the cross-sectional area of the gas inlet. Since the gas inlet is connected to the gas pipe, the cross-sectional area of the gas inlet is generally smaller than the cross-sectional area of the heat-exchanging part. Generally, the cross-sectional area of the heat-exchanging part is 2–100 times the cross-sectional area of the gas inlet. The cross-sectional area has been set in the range mentioned above for the following reason: If the cross-sectional area of gas distributing plate falls short of 1 times the cross-sectional area of the gas inlet, some of the gas will escape being distributed by the gas distributing plate and thorough gas distribution will be obtained with difficulty. Conversely, if the cross-sectional area in question exceeds 10.0 times the cross-sectional area of the gas inlet, the excess will possible cause the distributing plate to induce formation of a polymer.

Figure 3:
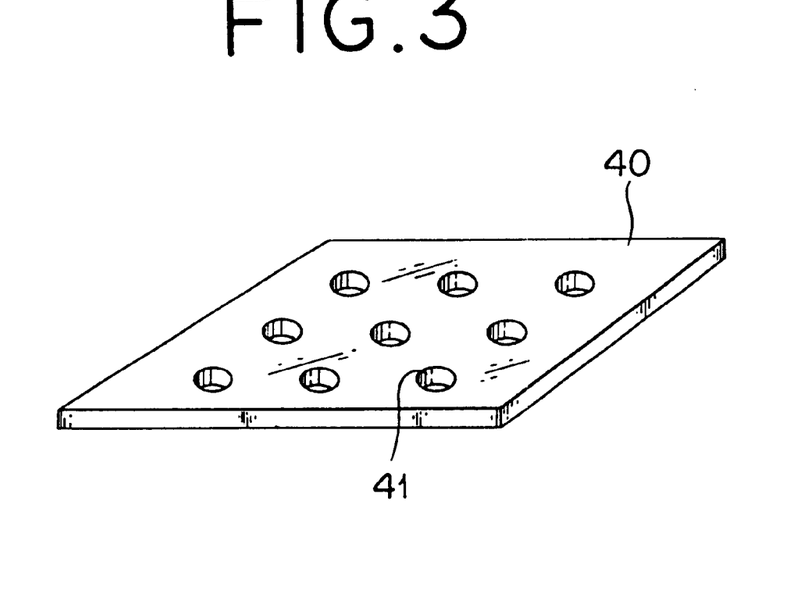
FIG. 3 is a perspective view illustrating a square gas distributing plate possessed of numerous circular holes and used in the heat exchanger of this invention.

The gas distributing plate can dispense with a through hole. When it is furnished with holes, the holes are effective in more uniformizing the distribution of a gas and preventing the gas distributing plate itself from inducing polymerization. Properly, the plate containing such holes has a opening area ratio in the range of 10–60%, more preferably in the range of 20–55%, and particularly preferably in the range of 40–50%. If the opening area ratio falls short of 10%, the shortage will unduly increase the proportion of the gas which fails to pass through the distributing plate, prevent the distribution from uniformly proceeding for the incorporation of holes, and force the distributing plate to induce formation of a polymer. Conversely, if the opening area ratio exceeds 60%, the excess will unduly increase the proportion of the gas which passes through the distributing plate possibly to the extent of rendering uniform distribution infeasible. The term "cross-sectional area of the gas distributing plate" as used in the specification hereof means the surface area of a flat surface part existing in the case of a opening area ratio of 0%. When the gas distributing plate is possessed of numerous openings as illustrated in FIG. 3, the actual surface area of the flat surface is found by this formula: cross-sectional area×(100−opening area ratio(%))/100. The opening area ratio (%) is defined by this formula: (opening area/cross-sectional area of gas distributing plate)×100.

Figure 4:
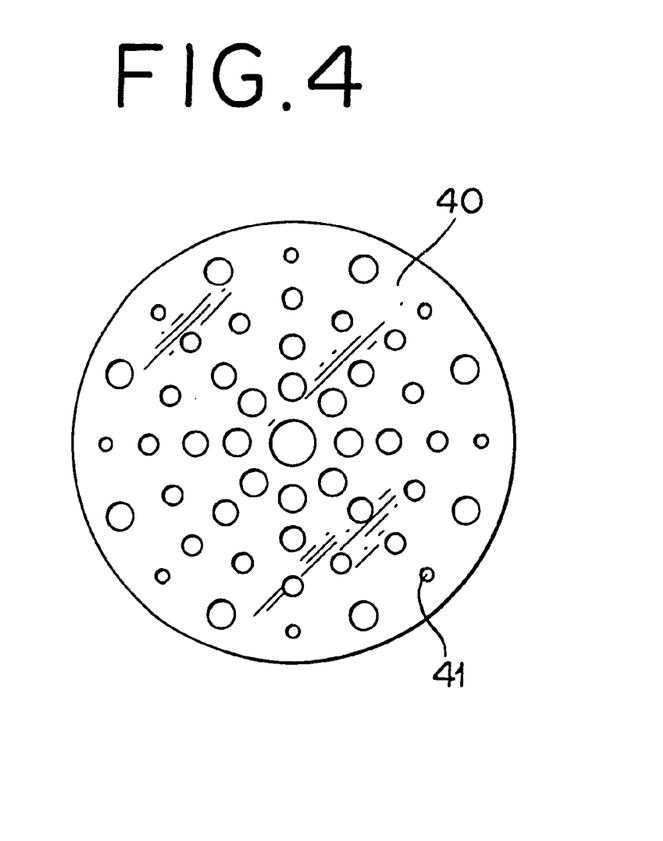
FIG. 4 is a plan view illustrating a circular gas distributing plate possessed of numerous circular holes of varying diameters and used in the exchanger of this invention.

FIG. 3 illustrates a preferred mode of the gas distributing plate. FIG. 3 depicts a tetragonal plate furnished with circular through holes. The gas distributing plate (40) contemplated by this invention is only required to be shaped like a plate having a circular or elliptic shape, or a polygonal figure such as a triangle or a tetragon, for example. The holes (41) opened in the plate do not need to be in a circular or elliptic shape exclusively but may be in a polygonal shape such as, for example, a triangle or a tetragon. Incidentally, the holes are preferred to be uniformly distributed in the gas distributing plate but are not required to be identical in shape. FIG. 4 illustrates a circular gas distributing plate (40) furnished with circular through holes having varying diameters. In this invention, the holes varying in size may be distributed as illustrated in FIG. 4.

In the distributing plate (40) to be used in this invention, the opening area in one of the hole in the distributing plate (41) is in the range of 20–1000 mm$^2$, preferably in the range of 50–700 mm$^2$, and particularly in the range of 100–500 mm$^2$. If the opening area falls short of 20 mm$^2$, the shortage will force the holes to be blocked with a polymer and finally prevent the gas from being uniformly distributed in the heat-exchanging part and possibly entail the generation of a polymer in the heat-exchanging part. Conversely, if the opening area exceeds 1000 mm$^2$, the excess will possibly prevent the gas from being thoroughly distributed during its passage through the gas distributing plate and force the gas to entail formation of a polymer in the heat-exchanging part.

Generally, the distribution of a gas is varied with the location of the gas distributing plate. The layout of the distributing plate (40) to be used in this invention will be explained with the aid of FIG. 2. In this invention, the distance (Ln) between the gas inlet and the gas distributing plate is in the range of 0.5–3.0 times, preferably in the range of 0.6–2.5 times, and particularly in the range of 0.8–2.0 times the equivalent diameter of the gas inlet, and the distance (Lt) between the gas distributing plate and the heat-exchanging part is in the range of 1.0–5.0 times, preferably in the range of 1.1–4.0 times, and particularly in the range of 1.2–3.0 times the distance (Ln) between the gas inlet and the gas distributing plate. If the Ln falls short of 0.5 times the equivalent diameter mentioned above, the shortage will tend to prevent the gas entering the gas inlet from being distributed throughout the entire surface of the gas distributing plate and force the gas to entail formation of a polymer on the surface of the gas distributing plate. Conversely, if it exceeds 3.0 times the equivalent diameter, the excess will decrease the amount of the gas contacting the gas distributing plate and consequently bring insufficient distribution of the gas. If the Lt falls short of 1.0 times the Ln mentioned above, the shortage will prevent the gas from being sufficiently distributed in the heat-exchanging part located most closely to the gas distributing plate. Conversely, if it exceeds 5.0 times the Ln, the excess will be at a disadvantage in necessitating an addition to the length of the channel of the heat exchanger. The gas inlet does not need to assume a circular shape exclusively but may assume a polygonal shape like a triangle or a tetragon, for example. The easily polymerizing substance-containing gas tends to stagnate in angular parts and consequently entail formation of a polymer because of the stagnation. When the gas inlet is in a circular shape lacking a corner, therefore, it is at an advantage in preventing the easily polymerizing substance from polymerizing. When the gas inlet is in a circular shape, the equivalent diameter of the gas inlet means the inside diameter thereof. When the gas inlet is not in a circular shape, the magnitude found by the calculation of the formula, 4×cross-sectional area of gas inlet/inner circumferential length of gas inlet, is used as the equivalent inside diameter in the calculation of the distance (Ln) between the gas inlet and the gas distributing plate. The gas distributing plate (40) is preferred to be disposed parallelly or nearly parallelly to the surface of the heat-exchanging part approximating most closely to the gas distributing plate which is exposed to the gas. In FIG. 2, the tube sheet (13) corresponds to the gas-contacting surface of the heat-exchanging part approximating most closely to the gas distributing plate.

Figure 5:
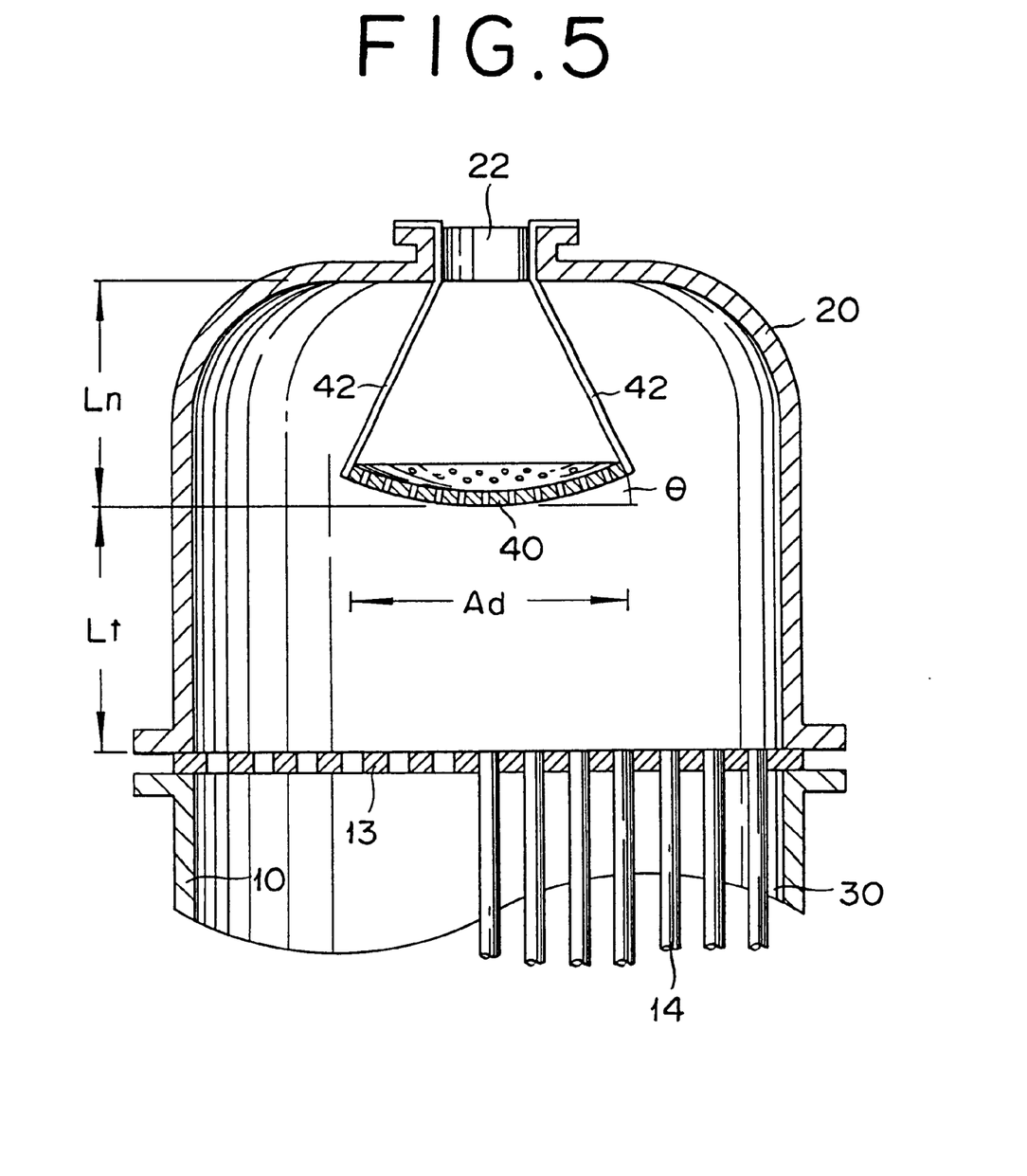
FIG. 5 is a partial diagram illustrating one mode of the heat exchanger of this invention, wherein the gas distributing plate has a protruding surface.

Then, FIG. 5 illustrates part of the heat exchanger having disposed therein the distributing plate (40) which forms a surface protruding from the gas inlet toward the heat-exchanging part. The protruding surface of this sort is advantageous in enabling the gas to be distributed as far as the outer peripheral part of the heat-exchanging part. This protruding surface is properly such that the angle ($\theta$) falls in the range of 0.1–20°, preferably in the range of 1–15°, and particularly in the range of 3–10°. If this angle falls short of 0.1°, the shortage will tend to induce distribution of the gas in the outer peripheral part of the heat-transfer surface. Conversely, if this angle exceeds 20°, the excess will be at a disadvantage in entailing insufficient distribution of the gas in the outer peripheral part. When the gas distributing plate has a shape other than a circle, the angle formed between the center of gravity of the gas distributing plate and the outer peripheral part most distant from the center of gravity is required to fall in the range specified above. Incidentally, when the distributing plate has such a protruding surface as illustrated in FIG. 5, the distance from the gas inlet to the most protruding part of the gas distributing plate corresponds to the distance (Ln) between the gas inlet and the gas distributing plate and the distance from the protruding surface to the position approximating most closely to the heat-exchanging part corresponds to the distance (Lt) between the gas distributing plate and the heat-exchanging part.

The heat exchanger of this invention is possessed of the gas distributing plate (40). The disposal of this distributing plate (40) is easily implemented by having the gas distributing plate suspended with one or more gas distributing plate-supporting members (42) as illustrated in FIG. 5. For the purpose of effecting heat exchange on an easily polymerizing substance-containing gas, the absence of a structure from the interval between the gas inlet and the heat-exchanging part is intrinsically preferred. When the easily polymerizing substance-containing gas contacts an intervening structure, if any, it tends to condense and stagnate on the contacting surface of the structure and entail generation of a polymer. For the purpose of enabling the introduced gas to be distributed more uniformly, it is permissible to have a plurality of such distributing plates disposed in the range mentioned above. The provision of the plurality of gas distributing plates possibly add to the uniformity of the distribution.

It is proper to use steel as the materials for the gas distributing plate (40) and the gas distributing plate-supporting member (42). On account of the ease of welding, such items of known steel as austenite steel, austenite ferrite steel, and ferrite steel can be used preferably. The reason for this preference is that the steel of interest avoids reacting with an easily polymerizing substance, degenerating an easily polymerizing substance, or corroding a heat-transfer tube itself.

Further, when the gas distributing plate or the gas distributing plate-supporting member forms a protruding part on the surface thereof, it automatically gives rise to a depressed part. In this depressed part, the easily polymerizing substance-containing gas condenses and stagnates and consequently tends to generate a polymer. This invention, therefore, prefers the gas distributing plate to have such an outer surface that the magnitude, Ry, which is specified in JIS (Japanese Industrial Standard) B0601 (-1994) is not more than 12.5, preferably not more than 3.2. This surface roughness of the gas distributing plate can be accomplished by treating the surface of this plate.

For the surface treatment of this sort, such mechanical polishing as buffing and electropolishing are available. The buffing is a method of polishing which is adopted when a flat smooth surface or a glossy surface is to be obtained. For the buffing, coarse polish with a stationary abrasive, a medium polish with a semisolid or free abrasive, and finish polish are available. For the buff abrasive, besides such soft materials as leather and cloth which are intended for polishing a surface, oily, non-oily, or spray solvents containing tripolysilicate, silicon carbide, fused alumina, calcined alumina, and chromium oxide as an abrasive can be used.

The electropolishing is a method for smoothing a metallic surface while melting it. As the electropolishing solution which fits the gas distributing plate made of iron or steel, perchloric acid type, sulfuric acid type, phosphoric acid type, sulfuric acid-phosphoric acid can be used. Since the iron and the steel have their textures largely varied not only with their compositions but also with the degrees of heat treatment and fabrication, they can be properly selected so as to suit the particular gas distributing plate to be used. It, therefore, suffices to make this selection properly, depending on the amount of acetic anhydride to be added generally to a perchloric acid type electrolyte, the temperature of electrolysis, the density of electric current, the voltage, the duration of electrolysis, etc. Optionally, the gas distributing plate may be subjected to mechanical polishing and further to electropolishing.

This invention contemplates using the gas distributing plate (40) not only for distributing a gas but also for preventing an easily polymerizing substance from forming a polymer. When the heat exchanger happens to be a shell-and-tube type heat exchanger, therefore, it does not need to impose any particular limit on the specification excepting the requirement that the gas distributing plate mentioned above can be interposed between the gas inlet and the heat-exchanging. The heat exchanger does not need to be limited to one-pass operation inside and outside the tubes. The number of passes of operation can be selected arbitrarily on either side.

Further, the heat exchanger of this invention permits arbitrary selection of the type of a partition plate among the separation with a cover plate, the integration with a cover plate, and the integration with a tube sheet. Likewise, the form of fixing a tube sheet and a shell may be freely selected among the type using a stationary tube sheet, the type using a externally sealed floating tubesheet, and the type using a pull through floating head. The outside diameter and the length of heat-transfer tubes to be laid inside the shell may be properly selected so as to suit the size, shape, and purpose of use of the heat exchanger to be used. On the condition that the heat exchanger is possessed of the structure described above, this heat exchanger may be produced with a baffle plate, an longitudinal baffle plate, a impingement plate, a channel side shell flange, a shell cover side shell flange, a shell side nozzle, a floating head cover, tie rods and spacers, a gas vent connection, instrument connections, a supporting saddle, a lifting lug, a liquid level gauge connection, an expansion joint, and a device for resisting inflation which are used in ordinary heat exchangers.

Figure 6:
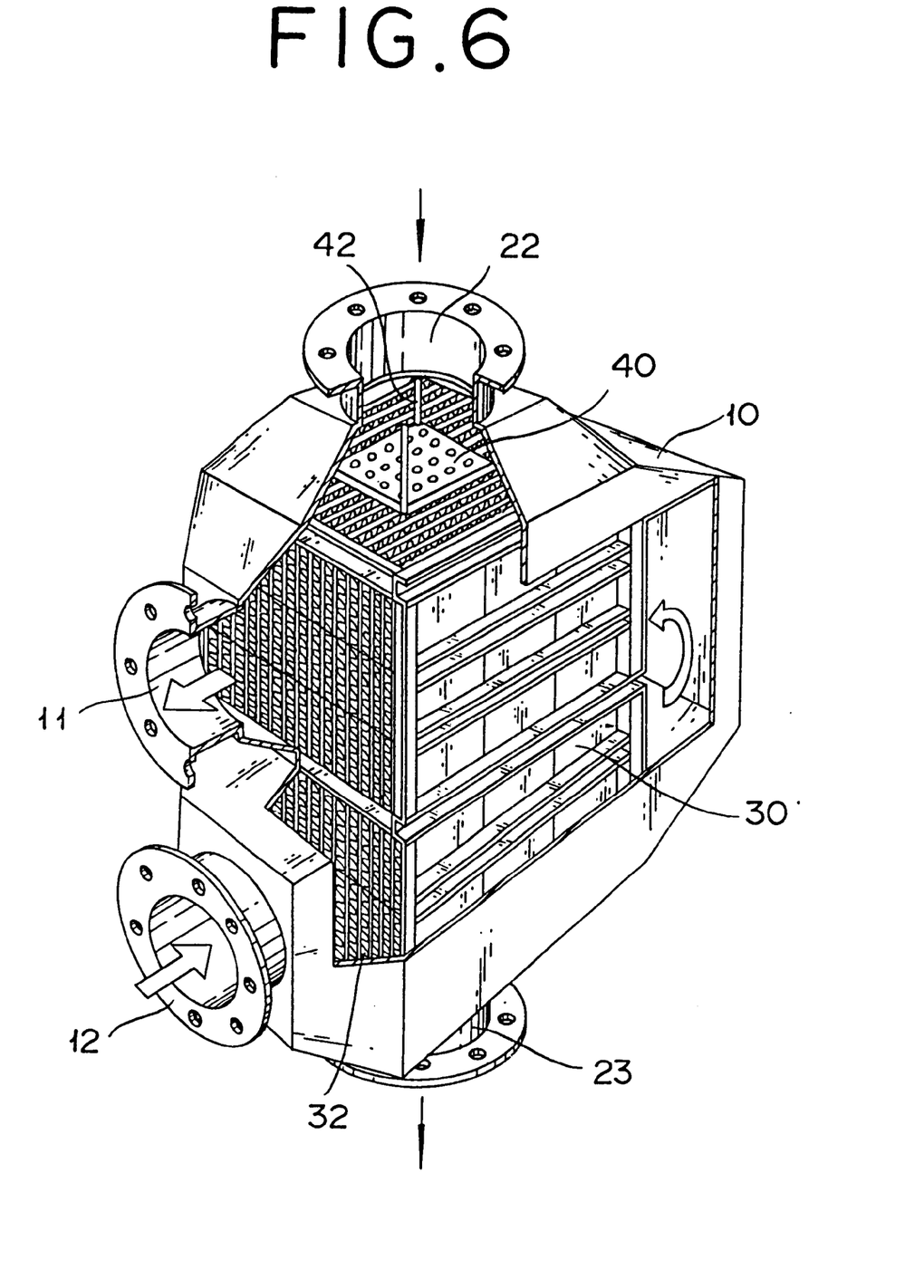
FIG. 6 is a perspective view illustrating schematically one mode of the plate type heat exchanger of this invention. In this diagram, the flow of the heat-exchanging gas is indicated by filled arrow marks and the flow of the fluid is indicated by empty arrow marks.
Figure 7:
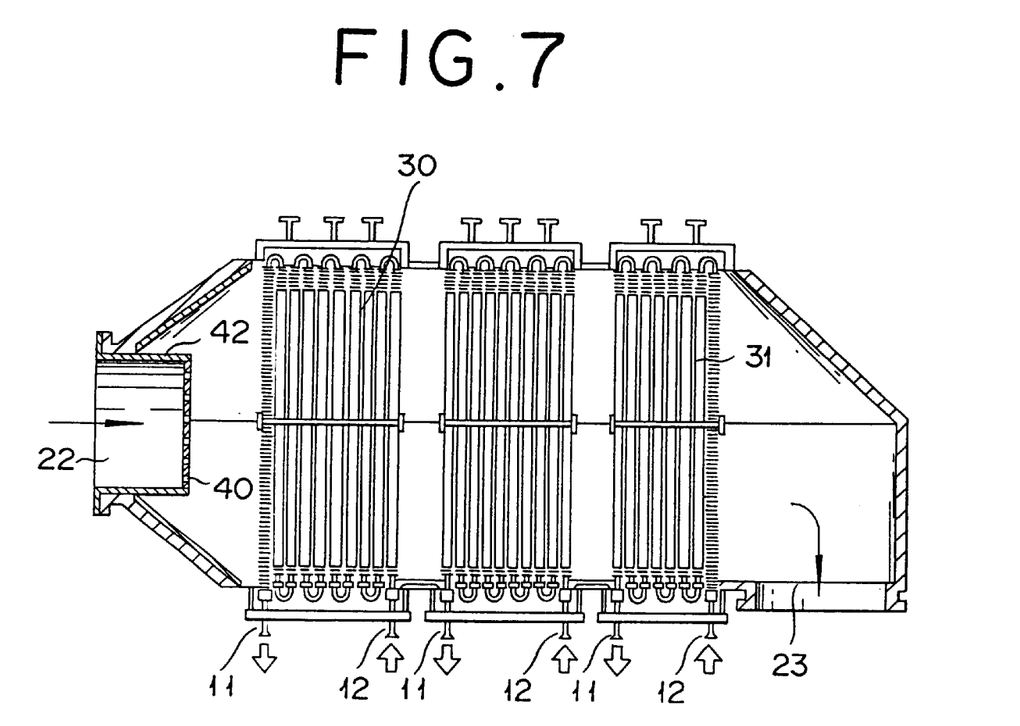
FIG. 7 is a cross section illustrating schematically one mode of the fin tube type heat exchanger of this invention. In this diagram, the flow of the heat-exchanging gas is indicated by filled arrow marks and the flow of the fluid is indicated by empty arrow marks.
Figure 8:
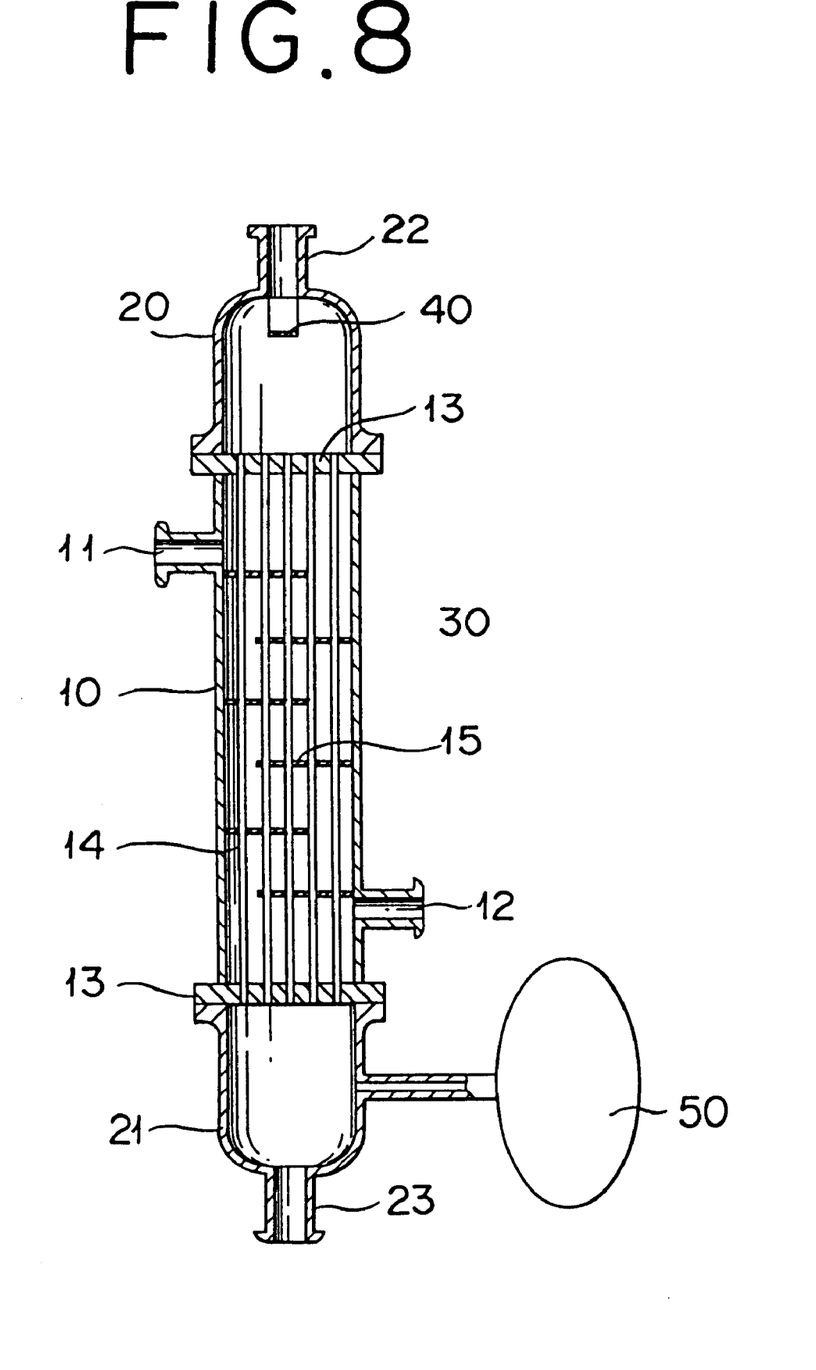
FIG. 8 is a diagram illustrating schematically a heat exchanger furnished with a vacuum generating device (50) and used in a working example.

The heat exchanger of this invention is embodied in various types such as, for example, the shell-and-tube type which, as illustrated in FIG. 8, comprises tube sheets attached inside a shell, heat-transfer tubes constrained in position at the terminals thereof at least on one side, and fluid adapted to be circulated around the outer peripheries thereof, the plate type which, as illustrated in FIG. 6, comprises corrugated ribs or heat-transfer plates forming hemispherical projections thereon superposed and clamped through the medium of gaskets after the fashion of a filter press thereby interposing a thin flow path of a rectangular cross section between the adjacent plates and a high temperature fluid and a low temperature fluid adapted to flow through the alternating flow paths thereby effecting necessary heat exchange between the two fluids, and the fin tube type which, as illustrated in FIG. 7, comprises heat-transfer tubes provided on the inner surfaces and/or outer surfaces thereof with fins.

The heat exchanger of this invention can be used in any of (1) a heater, i.e. a heat exchanger to be used for the purpose of heating a given fluid to a required temperature without changing the phase, (2) a preheater, i.e. a heat exchanger to be used for the purpose of heating a given fluid in advance and consequently exalting the efficiency of the subsequent step, (3) a superheater, i.e. a heat exchanger to be used for the purpose of heating a given fluid till a superheated state, (4) an evaporator, i.e. a heat exchanger to be used for the purpose of vaporizing a given fluid by heating, (5) a re-boiler, i.e. a heat exchanger to be used for the purpose of causing fluid condensed in a device to be heated again till vaporization, (6) a cooler, i.e. a heat exchanger to be used for the purpose of cooling a given fluid till a required temperature, (7) a chiller, i.e. a heat exchanger to be used for the purpose of cooling a given fluid till a very low temperature below 0° C., (8) a condenser, i.e. a heat exchanger to be used for the purpose of cooling a condensable gas till condensation and liquefaction, (9) a total condenser, i.e. a heat exchanger to be used for the purpose of thoroughly condensing a given condensable gas, and (10) a partial condenser, i.e. a heat exchanger to be used for the purpose of causing a given condensable gas to be partly condensed and liquefied and allowing the remainder thereof to be released in the gaseous state into the subsequent step, for example.

The heat exchanger of this invention can be further used as the reactor for the reaction of catalytic gas phase oxidation. The reaction of catalytic gas phase oxidation is a reaction which is induced by supplying a given raw material in a gaseous state to a catalyst for the reaction of catalytic gas phase oxidation contained in advance in a multiple of tubes with a view to oxidizing the raw material into the target product or an intermediate thereof. It is generally a exothermic reaction. It is, therefore, common for this reaction to circulate fluid around the outer peripheries of the multiplicity of tubes for the sake of heat exchange. When the intermediate of the reaction of catalytic gas phase oxidation happens to be an easily polymerizing substance-containing gas and this intermediate is intended to be converted by the reaction of catalytic gas phase oxidation into the target product, the known reactor for the reaction of catalytic gas phase oxidation is not different at all from the shell-and-tube type heat exchanger in respect that it is possessed of a gas inlet part and a heat-exchanging part. By interposing the gas distributing plate between the heat-exchanging part and the gas inlet of the reactor, therefore, it is made possible to implement effectively the uniform distribution of the easily polymerizing substance-containing gas to be supplied to the multiplicity of tubes individually.

This reaction of catalytic gas phase oxidation can be adopted particularly advantageously when any of the raw material gas, the reaction product, and the intermediate contains an easily polymerizing substance and the reaction is an exothermic reaction. More specifically, acrylic acid, methacrylic acid, acrolein, and methacrolein which are produced by subjecting such raw material gases as propylene, propane, isobutylene, and methacrolein to catalytic gas phase oxidation with a molecular oxygen-containing gas in the presence of an oxidizing catalyst may be cited, for example.

Further, the heat exchanger of this invention can be used as a condenser for producing (meth)acrylic acid. Now, the method for producing (meth)acrylic acid by incorporating therein a step of operating the heat exchanger of this invention as a condenser will be described.

First, the method for producing acrylic acid according to this invention comprises a step for obtaining a (meth)acrylic acid-containing gas, a step for absorbing acrylic acid in an absorbent, and a step for separating a low boiling substance and a high boiling substance from the absorbent and obtaining (meth)acrylic acid in a purified form.

As the step for obtaining (meth)acrylic acid-containing gas, the production of (meth)acrylic acid-containing gas is attained by subjecting propylene, acrolein, isobutylene, t-butyl alcohol, or methacrolein to the reaction of catalytic gas phase oxidation.

Then, the step for absorbing (meth)acrylic acid in an absorbent is a step for absorbing (meth)acrylic acid by the use of a known (meth)acrylic acid absorbent. This step is allowed to effect simultaneous discharge of a gas containing a small amount of organic substance.

The step for separating a low boiling substance and a high boiling substance from the absorbent and obtaining (meth) acrylic acid in a purified form is a step for separating low boiling impurities and high boiling impurities by means of distillation from the (meth)acrylic acid-containing solution obtained by the step of collection and obtaining crude (meth)acrylic acid. The step of interest may incorporate therein a step for adding an aldehyde treating agent to the crude (meth)acrylic acid and subsequently distilling the resultant mixture thereby expelling the aldehyde and obtaining (meth)acrylic acid of high purity.

When a gas containing the organic substance mentioned above is obtained, the gas is wholly or partly circulated to the step for obtaining the (meth)acrylic acid-containing gas and the remainder, if any, is disposed of by incineration, for example. This step may further incorporate therein a step for disposing by incineration, for example, the whole amount of the gas discharged from the step for collection and subsequently circulating the gas wholly or partly to the step for obtaining the acrylic acid-containing gas.

The heat exchanger of this invention can be utilized as a reactor for catalytic gas phase oxidation in the step for obtaining (meth)acrylic acid-containing solution, as a heat exchanger attached to a circulation pipe and/or a heat exchanger disposed in the device for disposing the waste gas at the step for circulating the gas, and as a condenser attached to a distillation column at the step for obtaining (meth)acrylic acid in a purified form, respectively in the method for production mentioned above.

Now, the use of the heat exchanger of this invention as a condenser will be described below with reference to FIG. 8 depicting the case of handling acrylic acid as an easily polymerizing substance. First, the acrylic acid-containing gas is introduced through a gas inlet (22) and then distributed through the medium of a gas distributing plate (40). Then, the gas is uniformly distributed throughout the entire surface of a tube sheet (13), subsequently transferred inside heat-transfer tubes (14), and discharged through a lower tube sheet (13). As the fluid for cooling the heat-transfer tubes, water may be used. It is supplied through a fluid inlet (12) to a heat-exchanging part (30), advanced through a flow path having the course thereof altered with a baffle plate (15), and discharged through a fluid outlet (11). Thus, the fluid has fulfilled its roll in the operation of heat exchange. FIG. 8 represents the mode of arbitrarily attaching a vacuum generating device (50) capable of being connected to the heat exchanger.

In the supply of the acrylic acid-containing gas to the heat exchanger of this invention, the linear velocity of this gas in the feed pipe is generally in the range of 5–60 m/s and the temperature of the feed gas is generally in the range of 40–100° C.

Generally, a polymerization inhibitor is added to the interior of a distillation column which is attached to the heat exchanger. As the polymerization inhibitor for this purpose, any of the known polymerization inhibitors which are intended for such easily polymerizing substances as acrylic acid can be used. Among other such known polymerization inhibitors, at least one member selected from the group consisting of hydroquinone, methoquinone, cresol, phenol, t-butyl catechol, diphenyl amine, phenothiazine, and methylene blue, p-phenylene diamines such as p-phenylene diamine, N-oxyl compounds such as 4,-hydroxy-2,2,6,6-tetramethyl piperidinoxyl, and molecular oxygen-containing gases are used particularly advantageously. The compounds enumerated above may be used either singly or in the form of a combination of two or more members. From the view point of the effectiveness manifested in inhibiting polymerization, the resistance to corrosion of a distillation device, and the ease with which the waste liquid emanating from the distillation device is disposed, phenothiazine and/or N-oxyl compounds, and molecular oxygen-containing gases are used particularly advantageously. Though the amount of the polymerization inhibitor to be used does not need to be particularly restricted, the total amount of the polymerization inhibitor is preferred to be in the range of 1–1000 ppm (by weight) based on the amount of the vapor of acrylic acid to be generated.

To the heat exchanger of this structure, a molecular oxygen-containing gas can be supplied. The supply of the molecular oxygen-containing gas is intended to prevent the easily polymerizing gas from yielding to polymerization. The molecular oxygen-containing gas may be directly mixed with the acrylic acid-containing solution by bubbling or indirectly mixed there with by solution in a solvent. Properly, the molecular oxygen-containing gas is generally supplied at a rate in the range of 0.1–1 vol. % based on the volume of the vapor of acrylic acid to be generated.

Though the production of methacrylic acid overlaps the production of acrylic acid in many points, it differs therefrom in the following points. For example, a methacrylic acid-containing liquid, prior to its introduction into the distillation column, is led to a step for extraction for the purpose of extracting methacrylic acid from the methacrylic acid-containing liquid by the use of a solvent. Even in this case, by fulfilling the conditions specified by this invention, the possible polymerization in the shell-and-tube type heat exchanger can be prevented.

EXAMPLES

Now, this invention will be described more specifically below with reference to working examples.

Example 1

Heat exchange was performed on acrylic acid gas by the use of a shell-and-tube type heat exchanger illustrated in FIG. 8. In this heat exchanger, the inside diameter of a shell was 900 mm, the outside diameter of heat-transfer tubes was 34 mm, the length of heat-transfer tubes was 3000 mm, the number of heat-transfer tubes was 305, and the diameter of an acrylic acid gas inlet was 200 mm. A gas distributing plate 300 mm in diameter was disposed parallelly to a heat-exchanging part at a position 200 mm from the acrylic acid gas inlet and 600 mm from a tube sheet. The gas distributing plate was a perforated plate containing a plurality of openings 12 mm in diameter at a opening area ratio of 20%.

Water as a heat-transfer fluid for the heat exchanger was supplied to a heat-exchanging part and, at the same time, acrylic acid gas containing 200 wt. ppm of phenothiazine as a polymerization inhibitor and 1 vol. % of air was introduced at a flow rate of 700 kg/h from the gas inlet toward the heat-transfer tubes. The temperature of the acrylic acid gas was 85° C. at the inlet of the heat-exchanging part. The acrylic acid gas was wholly condensed by adjusting the flow rate of the heat-transfer fluid, then cooled to 40° C., and discharged from the heat-exchanging part.

The heat exchanger and the vacuum generation device positioned on the downstream side thereof were found to have absolutely no sign of polymerization during six months' operation. When the interior of the heat exchanger was inspected after termination of the operation, the heat-transfer tubes showed no sign of clogging with a polymer. Though the supporting member for the gas distributing plate showed a sign of adhesion of a trace of polymer, the amount of adhesion was not so large as to affect the function of the heat exchanger.

Comparative Example 1

Heat exchange was performed on acrylic acid gas by following the procedure of Example 1 while excluding the gas distributing plate from the shell-and-tube heat exchanger.

In the acrylic acid gas supplied in the same flow rate as in Example 1, condensation was attained only in a portion of about 660 kg/h. Acrylic acid flowed into the vacuum generation device on the downstream side, lowered the ability of this device to generate vacuum, incited generation of polymer in the vacuum generating device, and consequently forced the heat exchanger to stop operation on the day following the start of operation. When the heat exchanger was inspected after the stop of the operation, adhesion of an acrylic acid polymer and clogging with the polymer were observed in 105 heat-transfer tubes approximating closely to the outer periphery of the bundle of heat-transfer tubes in the heat-exchanging part.

Example 2

Acrylic acid was cooled by following the procedure of Example 1 while using a flat plate having the same diameter and containing no opening in the place of the gas distributing plate. Though the cooling could be continued till 40° C. during the initial stage of the operation, the temperature of the acrylic acid ascended with the elapse of time. After one month of the operation, the device was stopped at the time that the cooling temperature subsequent to the condensation reached 55° C. When the interior of the heat exchanger was inspected, clogging with an acrylic acid polymer was observed in 31 heat-transfer tubes approximating closely to the center of the bundle of heat-transfer tubes. The operation of the device nevertheless could be continued for one month. Further, adhesion of about 3 kg of polymer was observed on the rear sides of the gas distributing plate and the distributing plate-supporting member. The vacuum generation device was observed at this time to suffer an increase of load with the elapse of time. The inspection of this device after the stop of operation, however, failed to detect any polymer.

Example 3

Acrylic acid was cooled by following the procedure of Example 1 while having the gas distributing plate disposed at a position of 600 mm from the gas inlet. When the operation was discontinued after two months and the interior of the heat exchanger was inspected, clogging with an acrylic acid polymer was observed in 8 heat-transfer tubes approximating closely to the outer periphery of the bundle of heat-transfer tubes and in 3 heat-transfer tubes approximating closely to the center of the bundle of heat-transfer tubes. The heat exchanger nevertheless could be stably operated continuously for two months. At this time, the vacuum generation device showed no sign of abnormality. The amount of adhesion of the polymer to the gas distributing plate and the supporting member was on a per with that in Example 1. It was not so much as to affect the ability of the device to exchange heat.

Example 4

Acrylic acid was cooled by following the procedure of Example 1 while using a perforated plate having a diameter of 700 mm and containing a plurality of openings 12 mm in diameter at a opening area ratio of 20%. When the heat exchanger was stopped after two months' stable operation and the interior of the heat exchanger was inspected, the heat-transfer tubes showed no sign of clogging with an acrylic acid polymer. Adhesion of about 1 kg of a polymer was observed in the outer peripheral part of the gas distributing plate. At this time, the vacuum generation device showed no sign of abnormality.

What is claimed is:

1. A heat exchanger for an easily polymerizing substance-containing gas provided with a gas distributing plate between a gas inlet and a heat-exchanging part, wherein the distance between said gas inlet and said gas distributing plate is in the range of 0.5–3.0 times the diameter of said gas inlet and the distance between said gas distributing plate and said heat-exchanging part is in the range of 1.0–5.0 times the distance between said gas inlet and said gas distributing plate.

2. A heat exchanger according to claim 1, wherein the cross-sectional area of said gas distributing plate is in the range of 1.0–10.0 times the cross section of said gas inlet.

3. A heat exchanger according to claim 1, wherein said gas distributing plate is a perforated plate having a opening area ratio in the range of 10–60%.

4. A heat exchanger according to claim 1, wherein the opening area in one of the holes in said perforated plate is in the range of 20–1000 mm$^2$.

5. A heat exchanger for an easily polymerizing substance-containing gas provided with a gas distributing plate between a gas inlet and a heat-exchanging part, wherein said gas distributing plate forms a surface protruding from said gas inlet toward said heat-exchanging part and said protruding surface is such that the angle formed by the center of said gas distributing plate and the outer peripheral part of said gas distributing plate is in the range of 0.1–20°.

* * * * *